United States Patent [19]
Haller

[11] 3,797,620
[45] Mar. 19, 1974

[54] FRICTION CLUTCHES

[76] Inventor: Richard Haller, Ueberlandstrasse 240, Dubendorf, Switzerland

[22] Filed: Aug. 4, 1972

[21] Appl. No.: 277,993

[30] Foreign Application Priority Data
Aug. 6, 1971 Switzerland............... 11591/71

[52] U.S. Cl................. 192/56 R, 64/30 E, 192/78, 192/141
[51] Int. Cl...................... F16d 43/21, F16d 13/16
[58] Field of Search............. 192/77, 78, 141, 56 R; 64/30 E; 188/336

[56] References Cited
UNITED STATES PATENTS

| | | | |
|---|---|---|---|
| 2,562,466 | 7/1951 | Kesterton | 192/77 |
| 299,290 | 5/1884 | Stiles | 192/78 |
| 466,224 | 12/1891 | Curtis, Jr. | 192/78 X |
| 818,331 | 4/1906 | Andrews | 192/78 |
| 1,603,798 | 10/1926 | Pilkington | 192/77 |

*Primary Examiner*—Allan D. Herrmann
*Attorney, Agent, or Firm*—Kenneth S. Goldfarb

[57] ABSTRACT

The invention provides a friction clutch having a driving member with a concentrically disposed cylindrical male end configuration, and a driven member with a cylindrical female end configuration. A cylindrical prestressed coupling element which is split by a gap is interposed between the end configurations for frictional driving engagement with one of the end configurations. A coupling ball engages opposed seats afforded by the gap in the coupling element and the surface on the other of said end configurations. These seats are relatively inclined such that relative axial movement of the end configurations while the clutch is engaged causes disengagement of the clutch by relieving the force urging the coupling element into frictional driving engagement with the respective end configurations. The gap in the coupling element may be directed obliquely and the other seat for the coupling ball may be provided by a trough-shaped elongated groove on the periphery of the male end configuration with outwardly diverging side wall end abutment surfaces on the said configuration.

4 Claims, 7 Drawing Figures

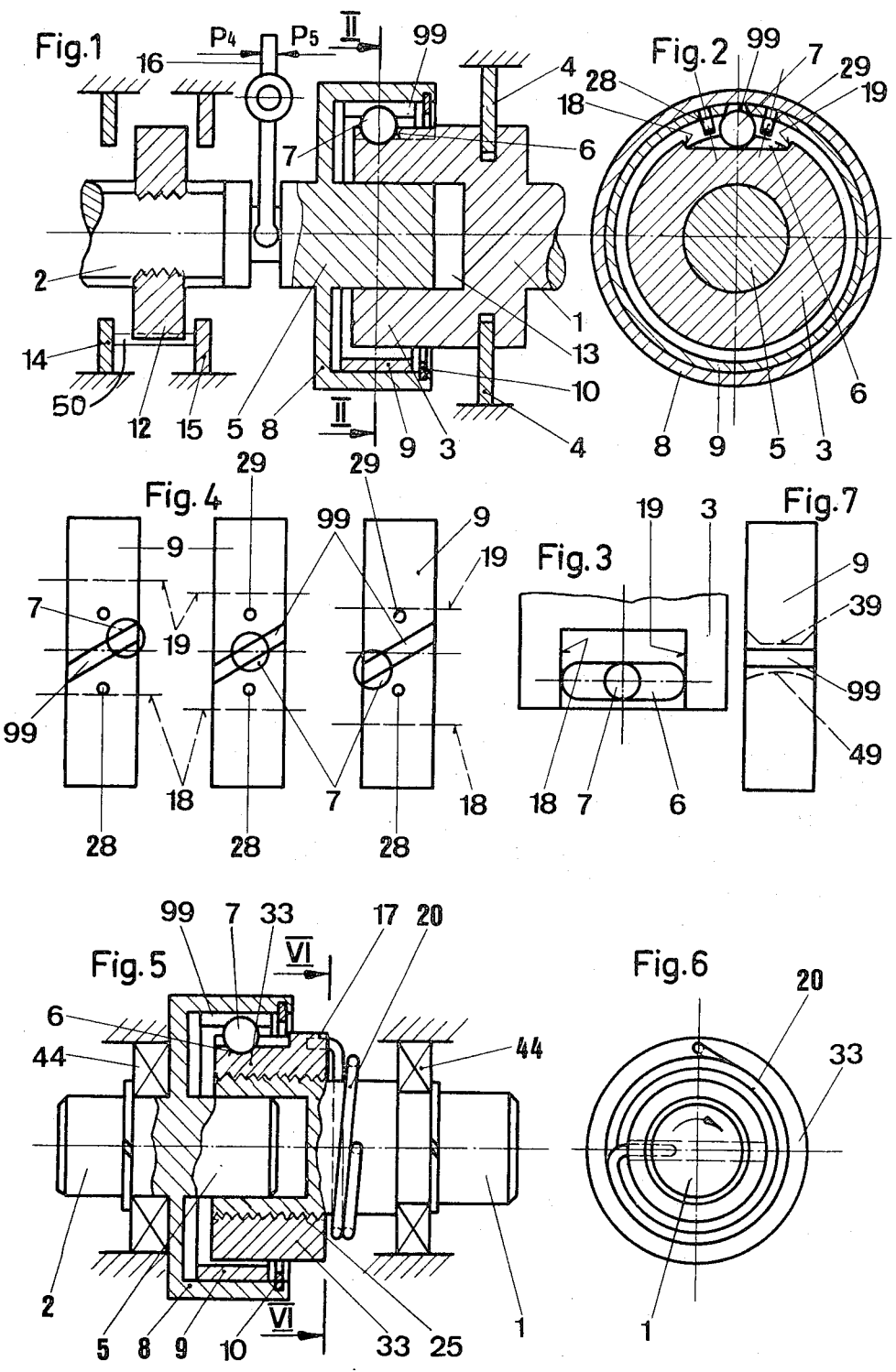

FRICTION CLUTCHES

In order to prevent accidents or damage due to overloading in friction clutches, it is known for the frictional force to be automatically reduced and if necessary the drive to be stopped. Such a facility is provided, for example, in lifting appliances as a blocking safeguard at the end of the stroke or as protection against damage on overloading.

An object of the invention is to provide a friction clutch, which has a simple yet effective construction and which disengages both when there is an overload of the torque as well as on relative axial movement of the drive or output shaft.

This is achieved with a friction clutch which has a cup shaped part of one driving member, into which a boss of the other driving member extends in axial direction and which is characterised according to the invention in that a slotted friction ring is located on the inner wall of the cup, in the slot of which, running axially or obliquely with respect to the axis, a clamping ball engages, which is supported on a flat part of the surface of the boss, which flat part is at right angles to the axis. Preferably the ball can be arranged to move in a rectilinear recess which is at right angles to the axis of the clutch and the friction ring can be arranged to move axially on the inner wall of the cup, in addition the slot of the friction ring can be inclined with respect to the axis of the clutch and the walls of the slot open conically inwards. On the one hand, on both sides of the slot, the friction ring may have a stop and on the other hand, at both ends of the ball recess, the boss may have a stop face, which stops abut against each other when the ring rotates with respect to the boss.

The invention will be further described by way of example only with reference to the drawings, in which FIG. 1 is a diagrammatic longitudinal section of an embodiment of friction clutch, according to the invention, which disengages when there is axial movement of the drive shaft caused by overloading, FIG. 2 is a section on the line II — II of FIG. 1., FIG. 3 is a plan view of a ball and the recess coupling of the clutch, FIG. 4 shows three positions of the ring, ball and boss stop components of the clutch, FIG. 5 is a diagrammatic longitudinal section of a second embodiment of friction clutch, in accordance with the invention, which disengages when there is an overload of the torque, FIG. 6 is a section on the line VI—VI of FIG 5 and, FIG. 7 is a plan view of a modification of a slotted ring component of the clutch.

In the first embodiment shown in FIGS. 1 to 4, a drive shaft 1 has an extension in the form of a bored boss with a cylindrical male end configuration.; 3, which is prevented from moving axially by a retaining ring 4. The boss 3 is mounted to rotate with its bore 13 on a butt end 5 of a drive shaft with a cylindrical female end configuration concentrically disposed about the male end configuration 2. On its periphery the boss 3 has a trough-shaped elongated groove 6 of semicircular cross-section in which a ball 7 is received. The boss 3 is milled at both ends of the recess 6 to provide outwardly diverging side wall abutment surfaces 18 and 19. The cylindrical surface so produced and terminated by the stops 18 and 19 which are straight in the axial direction, has a plane, rectilinear base which appears as a secant in cross-section of the boss (FIG.2).

The drive shaft 2 has a cup-shaped part 8, on the inner side of which there abuts a prestressed cylindrical coupling element 9. The ring 9 is somewhat narrower than the space allocated to it in the cup, so that it is still able to move axially therein. A slot 99 in the ring 9 runs obliquely transverse the ring and has a dove-tail cross section with inwardly diverging side walls. On both sides of the slot 99 the ring 9 carries a pin 28, 29 which projects inwardly of the ring to co-operate with the abutment surfaces 18 and 19.

The ball 7 thus engages with its one side the recess 6 and with its other side the slot 99.

When an overload occurs in the form of an axial displacement, the friction clutch disengages. The drive shaft 2 is constructed as a threaded spindle which can rotate in both directions and which engages a captive nut 12. According to the direction of rotation of the shaft 2, the nut 12 is held so that it can not rotate by any sort of conventional means plus the one shown by use of a guide rail 50 engaged in a groove in nut 12 so that it moves in one or other axial direction and thus by means of a connecting rod can be used for initiating a lifting movement. Stops 14 and 15 limit the movement of the nut 12. The shaft 2 is mounted for limited axial movement.

When the drive shaft 1 is rotated, torque is transmitted to the drive shaft 2, the recess 6 being moved with respect to the ball 7 from the central position shown in FIG. 2 and 3 and the ball being clamped in known manner between the recess 6 and ring 9. The ball 7 is forced into the slot 99 causing the ring 9 to be tightly pressed against the inner wall of the cup 8 and expand. The greater the pressure, the greater the frictional force which drives the cup 8 and thus also the shaft 2. The nut 12 moves as far as one of the stops 14, 15 whereupon a further rotation of the shaft 2 brings about an axial displacement of the shaft 2, this movement firstly opposes one of the forces $P_4$ or $P_5$ exerted by a rocking lever 16. If this force is also overcome, then the shaft 2 with cup 8 and the ring 9 held therein by frictional resistance moves axially, whereas the ball 7 in the recess 6 of the boss remains axially immovable. Due to the inclined slot 99, this difference in movement simultaneously causes rotation of the ring 9, until finally, according to the direction of rotation, one of the pins 28 or 29 abuts against one of the stops 18 or 19. Thus the ring 9 in the cup 8 is released, the frictional forces are reduced, and the ring rotates smoothly in the cup. As soon as it begins to rotate, due to a remaining force which pushes the ball 7 onto one edge of the slot 99, it is moved axially and released still more. The course of the axial movement is limited on the one hand by the base of the cup 8 and on the other hand by a spring ring 10. A switch connected to the rocking lever 16 can simultaneously stop the power driving the shaft 1.

In FIG. 4 in the centre the normal position of the ring 9 and the ball 7 is shown. On the left and right are shown the extreme positions in which the pins 28,29 abut against the surface 18,19. These positions depend on the direction of rotation of the drive shaft.

Thus in this embodiment the release of the frictional connection between the friction ring 9 and cup 8 depends directly on the lifting force exerted by the shaft 2.

FIGS. 5 and 6 show the second embodiment in which the disengagement depends directly on the torque which occurs.

Once again the reference numeral 1 indicates the drive shaft with the boss 33 mounted thereon, in this case by means of a screw thread 25, the reference numeral 2 indicates the drive shaft with the cup-like part 8 and the butt end of the shaft5, on which the drive shaft 1 is slidably mounted. Between the boss 33 and the cup 8 can be seen the ring 9 with the inclined slot 99 and the ball 7, which lies in the recess 6 and the slot 99. The axial movement of the ring 9 in the cup 8 is once more limited by the spring ring 10 and the ring also has pins which are not shown which co-operate with stops of the boss.

The drive and output shaft are guided both axially and radially in bearings 44. One end of a helical spring 20 is anchored on the side of the boss 33 in the bore 17, whereas the other end is secured in a transverse bore of the shaft 1. If the shaft 1 rotates in clockwise direction with respect to the boss 33 and shaft 32, then the spring 20 is placed under increased tension. Simultaneously due to the rotation of the shaft 1 and by means of the screw thread 25 the boss 33 is displaced axially on the shaft 1, which — as already described with reference to FIGS. 1 to 4 — causes a disengagement of the ball and the ring. The disengagement thus occurs as soon as a torque which exceeds a predetermined force is applied to the spring 20.

In the example described a single helical spring 20 is used for one direction of rotation. However two springs may be incorporated, each for one direction of rotation respectively. If the screw thread 25 is a self-locking screw thead, then the disengagement takes place as described by lateral displacement of the ring. If the screw thread is not self-locking, for example a screw thread with a steep pitch angle, then the clutch becomes a slipping clutch which immediately engages again when the torques of the shafts 1 and 2 match.

In the case of an axial slot 99 as shown in FIG.7, it is important for the disengagement that the opposed edges of the dove-tailed slot have a greater angle of divergence at both sides of the ring 9 as shown in two embodiments in FIG.7 by the dotted line 39 and the curved line 49.

It is also possible to mount the slotted ring on the boss and to provide a surface on the inner wall of the cup for the clamping ball, which surface presses the ball against the ring during rotation. However in this case the ring must not be expanded but compressed.

What is claimed is:

1. A friction clutch comprising a driving male member having a cylindrical male end configuration, a driven female member having a cylindrical female end configuration concentrically disposed about said male end configuration, a cylindrical coupling element which is split by a gap forming opposed inwardly diverging first seats, said coupling element being interposed between said male end configuration and said female end configuration for frictional driving engagement with one of said end configurations, said male end configuration having a trough-shaped elongated groove on the periphery thereof forming a ball seat, a coupling ball engaging said opposed seats and said ball seat pin means secured to said coupling element said ball seat having outwardly diverging side wall abutment surfaces, said pin means being engageable with said abutment surfaces so that relative axial movement of said end configurations while the clutch is engaged disengages said clutch by disengaging said coupling element from frictional driving engagemnt with said female end configuration.

2. A clutch as set forth in claim 1, wherein said female end configuration is provided on the driven member which includes a threaded spindle engaging a nut held against rotation, said nut being movable axially of the spindle between limits defined by fixed stops.

3. A clutch according to claim 2, wherein said gap is dovetailed in shape.

4. A clutch as set forth in claim 1, wherein a threaded spindle is disposed on said male end configuration and a helical spring engaging said spindle and said male end configuration for disengaging said clutch when overloaded.

* * * * *